United States Patent
Tamhankar et al.

(10) Patent No.: US 6,579,820 B2
(45) Date of Patent: Jun. 17, 2003

(54) REACTOR MODIFICATIONS FOR $NO_x$ REDUCTION FROM A FLUID CATALYTIC CRACKING REGENERATION VESSEL

(75) Inventors: Satish S. Tamhankar, Scotch Plains, NJ (US); Kirk Walton Limbach, Dresher, PA (US); Subodh Ganguly, Plainsboro, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 89 days.

(21) Appl. No.: 09/813,575

(22) Filed: Mar. 21, 2001

(65) Prior Publication Data

US 2003/0021737 A1 Jan. 30, 2003

(51) Int. Cl.[7] .................................................. B01J 38/12
(52) U.S. Cl. .............................. 502/20; 502/34; 502/38; 502/41; 502/42; 502/43; 502/49; 423/235; 423/239.1; 423/246; 423/247
(58) Field of Search ............................... 435/235, 239.1, 435/246, 247; 502/20, 34, 38, 41, 42, 43, 49; 422/144

(56) References Cited

U.S. PATENT DOCUMENTS

| | | | | |
|---|---|---|---|---|
| 4,051,069 A | | 9/1977 | Bunn, Jr. et al. ............. | 252/417 |
| 4,056,486 A | | 11/1977 | Bunn, Jr. et al. ............. | 252/417 |
| 4,198,287 A | * | 4/1980 | Hemler, Jr. et al. ........ | 208/113 |
| 4,313,848 A | | 2/1982 | Scott ........................... | 252/418 |
| 4,471,063 A | * | 9/1984 | Hettinger ...................... | 502/39 |
| 4,843,051 A | | 6/1989 | Kovacs et al. ................. | 502/42 |
| 5,240,690 A | | 8/1993 | Tang et al. ................... | 423/236 |
| 5,268,089 A | | 12/1993 | Avidan et al. ............... | 208/113 |
| 5,372,706 A | | 12/1994 | Buchanan et al. ........... | 208/113 |
| 5,705,053 A | | 1/1998 | Buchanan .................... | 208/113 |
| 5,716,514 A | | 2/1998 | Buchanan .................... | 208/113 |
| 5,827,793 A | * | 10/1998 | Hu ............................... | 502/41 |
| 5,830,346 A | * | 11/1998 | Haranoi et al. .............. | 208/113 |
| 5,908,804 A | | 6/1999 | Menon et al. ................. | 502/38 |
| 6,114,265 A | * | 9/2000 | Steffens et al. ............... | 502/52 |
| 2002/0072465 A1 | * | 6/2002 | Nahas et al. ................... | 502/38 |

* cited by examiner

Primary Examiner—Stanley S. Silverman
Assistant Examiner—Timothy C. Vanoy
(74) Attorney, Agent, or Firm—Philip H. Von Neida; Salvatore P. Pace

(57) ABSTRACT

A process for regenerating a spent catalyst having coke deposits thereon in a catalyst regeneration vessel having a dense phase and a dilute phase, wherein the process comprises the steps of: (a) contacting the spent catalyst with a primary oxygen-containing gas in the dense phase, thereby combusting the coke, resulting in the formation of a combustion gas comprising nitrogen oxides and carbon monoxide which further reacts, thus reducing a majority of the nitrogen oxides to form elemental nitrogen; and (b) contacting the combustion gas with a secondary oxygen-containing gas, and typically a shield gas, at a location just above the interface between the dense phase and the dilute phase and also in the dilute phase, thereby oxidizing the remaining CO to $CO_2$ without significant temperature rise in the dilute phase due to the after burn.

23 Claims, 7 Drawing Sheets

REACTOR MODIFICATIONS FOR $NO_x$ REDUCTION FROM A FLUID CATALYTIC CRACKING REGENERATION VESSEL

FIELD OF THE INVENTION

This invention relates to inexpensive process and reactor modifications for the reduction of nitrogen oxides ($NO_x$) emissions from catalytic cracking regenerators. More specifically, this invention relates to operating the regenerator such that up to about 1% carbon monoxide (CO) exits the dense catalyst zone, and to modifications that provide for the introduction of secondary oxygen-containing gas streams and, optionally, shield gas stream or streams into the dilute phase of the regenerator, thereby eliminating the majority of $NO_x$ emissions without producing significant CO emission and reducing temperature rise due to afterburn.

DESCRIPTION OF ART

In the fluid catalytic cracking (FCC) process, hydrocarbon feedstock is injected into the riser section of a hydrocarbon cracking reactor where it cracks into lighter, valuable products on contacting hot catalyst circulated to the riser-reactor from a catalyst regenerator vessel. As the endothermic cracking reactions take place, the catalyst is covered with coke deposits. The catalyst and hydrocarbon vapors are carried up the riser to the disengagement section of the reactor where they are separated. Subsequently, the catalyst flows into the stripping section where the hydrocarbon vapors entrained with the catalyst are stripped by steam injection, and the stripped catalyst flows through a spent catalyst standpipe and into the catalyst regenerator vessel.

The regenerator vessel is operated as a fluid bed reactor with the catalyst forming a dense phase in the lower section of the reactor and a dilute phase above the dense phase. Air or oxygen-enriched air is introduced through an air grid located in the dense phase near the bottom of the vessel. When the coke-laden catalyst comes in contact with the air the coke is burned forming CO and carbon dioxide ($CO_2$), which, along with the nitrogen in the air, pass upwards through the dense phase, into the dilute phase, and then exits the regenerator. These gases constitute the majority of the flue gas. During the coke combustion process, any nitrogen containing species present in the coke also react with oxygen to form mostly elemental nitrogen ($N_2$) and a small amount of NOx. These species, along with any sulfur oxides (SOx) formed by the combustion of sulfur present in the coke, also travel with the $CO/CO_2/N_2$ through the regenerator. The region of the reactor near the air grid, within the dense phase, has a high oxygen concentration that constitutes the oxidizing zone. Away, or downstream from the air grid, as oxygen is depleted, a reducing zone forms, where the CO concentration is significant. The CO continues to react with the remainder of the oxygen to form $CO_2$. In the reducing zone, NOx species also react with CO to form elemental nitrogen. Depending on the concentration of CO and $CO_2$ in this zone, more or less NOx will react.

The catalyst regeneration vessel may be operated in the complete CO combustion mode, which has now become the standard combustion mode, or in partial CO combustion mode. In the complete combustion operation, the coke on the catalyst is oxidized completely to form $CO_2$. This is typically accomplished by conducting the regeneration in the presence of excess oxygen, provided in the form of excess air. The exhaust gas from a complete combustion operation comprises primarily nitrogen, $CO_2$, $H_2O$ and excess oxygen, but also contains $NO_x$ and $SO_x$.

In the partial CO combustion mode of operation, the catalyst regeneration vessel is operated with insufficient oxygen to fully oxidize all of the coke in the catalyst to $CO_2$. Consequently the coke is combusted to a mixture of CO and $CO_2$. The remaining CO is oxidized to $CO_2$ in a downstream CO boiler. When the regeneration vessel is operated in the partial CO combustion mode, less $NO_x$ is produced, and that which is produced reacts with CO in the reducing zone to form elemental nitrogen. Instead, nitrogen species in the coke leave the regeneration vessel as reduced nitrogen species, such as, ammonia and HCN. However, the reduced nitrogen species are unstable in the CO boiler, where they are converted to $NO_x$. Thus the effluent from the CO boiler comprises primarily nitrogen, $CO_2$ and $H_2O$, but also contains $NO_x$ and $SO_x$.

Recently, there has been considerable concern about the amount of $NO_x$ and $SO_x$ being released to the environment in refinery flue gases. It is now the accepted view that most of the $NO_x$ present in catalyst regenerator exhaust comes from coke nitrogen, i.e., nitrogen contained in the coke in the form of hetero-compounds, such as, condensed cyclic compounds, and that little or none of the $NO_x$ contained in the exhaust gas is derived from the nitrogen contained in the air feed to the regeneration vessel.

Several approaches have been used in industry to reduce $NO_x$ in FCC regenerator vessel exhaust gases. These include capital-intensive and expensive options, such as pretreatment of reactor feed with hydrogen, and flue gas post-treatment options, such as Selective Catalytic Reduction (SCR), as well as the use of in-situ FCC catalyst additives. A number of other methods have also been contemplated for NOx reduction, as discussed below.

U.S. Pat. No. 5,268,089 discloses that $NO_x$ can be reduced by operating the regenerator "on the brink", i.e., in a region between conventional partial CO combustion operation and complete combustion operation with less than 2 mol % CO in the flue gas. The patent claims $NO_x$ reduction by operating in this mode. However, a CO boiler is still required to burn the CO exiting from the regenerator, as is the case in the partial combustion mode of operation. Furthermore, while U.S. Pat. No. 5,268,089 discloses the existence of afterburn as a result of operating "on the brink", a solution to avoid or mitigate the overheating in the dilute phase due to afterburn is not disclosed.

Several patents disclose the reduction of $NO_x$ in FCC regenerators by means of promoters, segregated feed cracking, post treatment of exhaust gas, etc. These patents are discussed in detail in U.S. Pat. No. 5,268,089, the disclosure of which is incorporated herein by reference.

U.S. Pat. Nos. 5,705,053, 5,716,514, and 5,372,706 each disclose variations of the basic idea of controlled air addition to flue gas from a regenerator operated in the partial combustion mode, before the CO boiler, to convert part of the $NO_x$ precursor species (HCN, $NH_3$) selectively to $N_2$ rather than $NO_x$. Consequently, in the CO boiler, less $NO_x$ is generated. In U.S. Pat. No. 5,705,053 an additional catalytic step is suggested for $NO_x/NH_3$ reaction. In U.S. Pat. No. 5,372,706, the thermal conversion of NOx precursors is claimed at temperatures between 2000 and 2900° F. In U.S. Pat. No. 5,716,514 flue gases are specifically removed from the regenerator and comprise at least 2.5% carbon monoxide. These gases are reacted in a separate turbulent flow reactor. In all of these patents, the secondary air addition is aimed at reacting part of the $NH_3$/HCN formed due to the partial combustion operation.

U.S. Pat. No. 5,240,690 suggests a partial combustion mode of operation and the addition of air to the regenerator off-gas comprising at least 1% carbon monoxide to oxidize $NH_3/HCN$ and preferentially produce $N_2$ prior to the CO boiler.

Efforts are continuously underway to find new and improved methods of reducing the concentrations of $NO_x$ and $SO_x$ in industrial flue gases, such as, FCC regeneration vessel exhaust gases. Notably absent from the prior art is the introduction of secondary oxygen-containing gases, optionally with shielding gases, into the dilute phase of the regeneration vessel, which is primarily operated in a complete combustion mode, whereby the majority of $NO_x$ is eliminated, CO is converted to $CO_2$, and the temperature rise due to after burn is controlled.

The present invention provides inexpensive regeneration vessel modifications that significantly reduce $NO_x$ emissions by concurrently introducing secondary oxygen-containing gases, optionally with shielding gases, into vessel which is operated in a manner that does not require the use of a CO boiler. The present invention provides means to eliminate the majority of NOx emissions from a FCC regenerator.

SUMMARY OF THE INVENTION

The present invention is directed to a process for substantially reducing the emission of nitrogen oxide from a regeneration reactor during the regeneration of a spent catalyst, such as, a hydrocarbon cracking catalyst, having coke deposits thereon, which comprises the steps of:

(a) contacting the spent catalyst with a primary oxygen-containing gas in the dense phase of the reactor, thereby combusting the coke and forming a combustion gas comprising nitrogen oxide and carbon monoxide which further react in said dense phase, thus reducing a majority of the nitrogen oxides to form elemental nitrogen, thereby forming a nitrogen-enriched combustion gas; and (b) contacting the nitrogen-enriched combustion gas in the dilute phase of the reactor with a secondary oxygen-containing gas, wherein the carbon monoxide is oxidized to form carbon dioxide.

The amount of the primary oxygen-containing gas in step (a) is adjusted so that the nitrogen-enriched combustion gas prior to step (b) comprises up to 1% carbon monoxide. As a result of this process, nitrogen oxide emissions from the regeneration reactor are significantly reduced while the temperature rise due to afterburn in the dilute phase is minimized and controlled by the introduction of a shield gas or heat removal devices.

The present invention also employs one or more nozzles configured to allow the secondary oxygen-containing gas, and, optionally, a shield gas, to be introduced into the dilute phase of the regeneration reactor so as to provide combustion conditions, and control the temperature rise due to afterburn in the dilute phase.

The secondary oxygen-containing gas introduced to the reactor oxidizes the residual CO exiting the dense phase. Steam or water may be added to the secondary oxygen-containing gas stream as a shield gas to assist in the even distribution of oxygen across the regenerator vessel and to reduce the temperature rise in the dilute phase due to the combustion of CO. The location of the one or more nozzles feeding the steam or water is selected such that there is minimal contact of steam with the majority of the catalyst, thereby avoiding catalyst deactivation. The excess heat generated in the dilute phase due to the exothermic CO oxidation may also be removed by other means, such as, for example, with a cooling coil located in the dilute phase.

The present invention may also be configured in such a manner that the secondary oxygen-containing gas is introduced in different stages at different vertical heights in the reactor vessel. For example, a portion of the secondary oxygen-containing gas may be introduced to the reactor at or just above the interface between the dense phase and the dilute phase, prior to introducing the main secondary oxygen-containing gas, as described above. The secondary oxygen-containing gas introduced at the interface is in an amount sufficient to combust the small amount of residual reduced nitrogen species, such as, $NH_3$ and HCN, contained in the combustion gas to form nitrogen oxides, which are subsequently reacted with CO to form elemental nitrogen. The secondary oxygen-containing gas is then staged or introduced to the dilute phase of the vessel at a point downstream in order to perform the process as described above. The secondary oxygen containing gas may be introduced to the interface between the dense and dilute phases of the reactor with one or more nozzles. Additionally, a shield gas may be introduced with the secondary oxygen-containing gas to assist in the even distribution of oxygen across the vessel and to avoid catalyst deactivation by creating a gas barrier between the steam introduced above that point and the catalyst.

In another embodiment of the present invention, to further eliminate the small amount of CO that may escape from the dilute phase of the regenerator vessel, the secondary oxygen-containing gas is staged or introduced to the exhaust flue of the vessel after carrying out the processes as described above. The oxygen-containing gas oxidizes any remaining CO that may be present in the flue gas, thus forming $CO_2$. The secondary oxygen-containing gas may be introduced to the exhaust flue with one or more nozzles. Additionally, a shield gas may also be introduced to assist in the even distribution of oxygen across the exhaust duct and control the temperature rise due to afterburn.

Significant cost savings relative to the large reduction in NOx occur since no separate NOx removal equipment is required downstream. In addition, the process of the present invention is advantageous since it involves minimal modifications to the existing regeneration vessel and associated equipment, compared to installation of a secondary air grid. Furthermore, because there is virtually no CO exiting the reactor, no downstream carbon monoxide boiler is required.

The present invention is also directed to a catalyst regeneration vessel having a dense phase and a dilute phase comprising:

(a) a means for introducing a primary oxygen-containing gas into the dense phase of the regeneration vessel; and (b) a means for introducing a secondary oxygen-containing gas into the dilute phase of the regeneration vessel.

In one embodiment of the present invention, the regeneration vessel is a reactor. Preferably, a means for introducing a primary oxygen-containing gas to the reactor is an air grid located in the dense phase. In addition, preferably, one or more means for introducing a secondary oxygen-containing gas, and optionally a shield gas, into the reactor is in the form of nozzles, which are located in the side walls and/or the dome of the reactor at various angles and heights. In another embodiment of the present invention, the reactor has a means for staging the introduction of the secondary oxygen-containing gas to the dilute phase of the reactor at or just above the interface with the dense phase. In yet another embodiment of the present invention, the reaction vessel has a means for staging the introduction of the secondary oxygen-containing gas to the exhaust flue of the vessel.

DETAILED DESCRIPTION OF THE PREFERRED EMBODIMENTS

According to this invention, $NO_x$ emissions from a FCC regeneration vessel are reduced significantly by operating the regenerator essentially in a complete combustion mode such that up to about 1% CO by volume exits the dense catalyst phase, and by introducing secondary oxygen-containing gases, and, optionally, shield gases, which can improve CO conversion while reducing temperature rise and improve the distribution of oxygen in the dilute phase. Afterburn temperature rise in the dilute catalyst phase may also be controlled by a separate mechanism, such as, with a heat exchanger.

Figure 1:
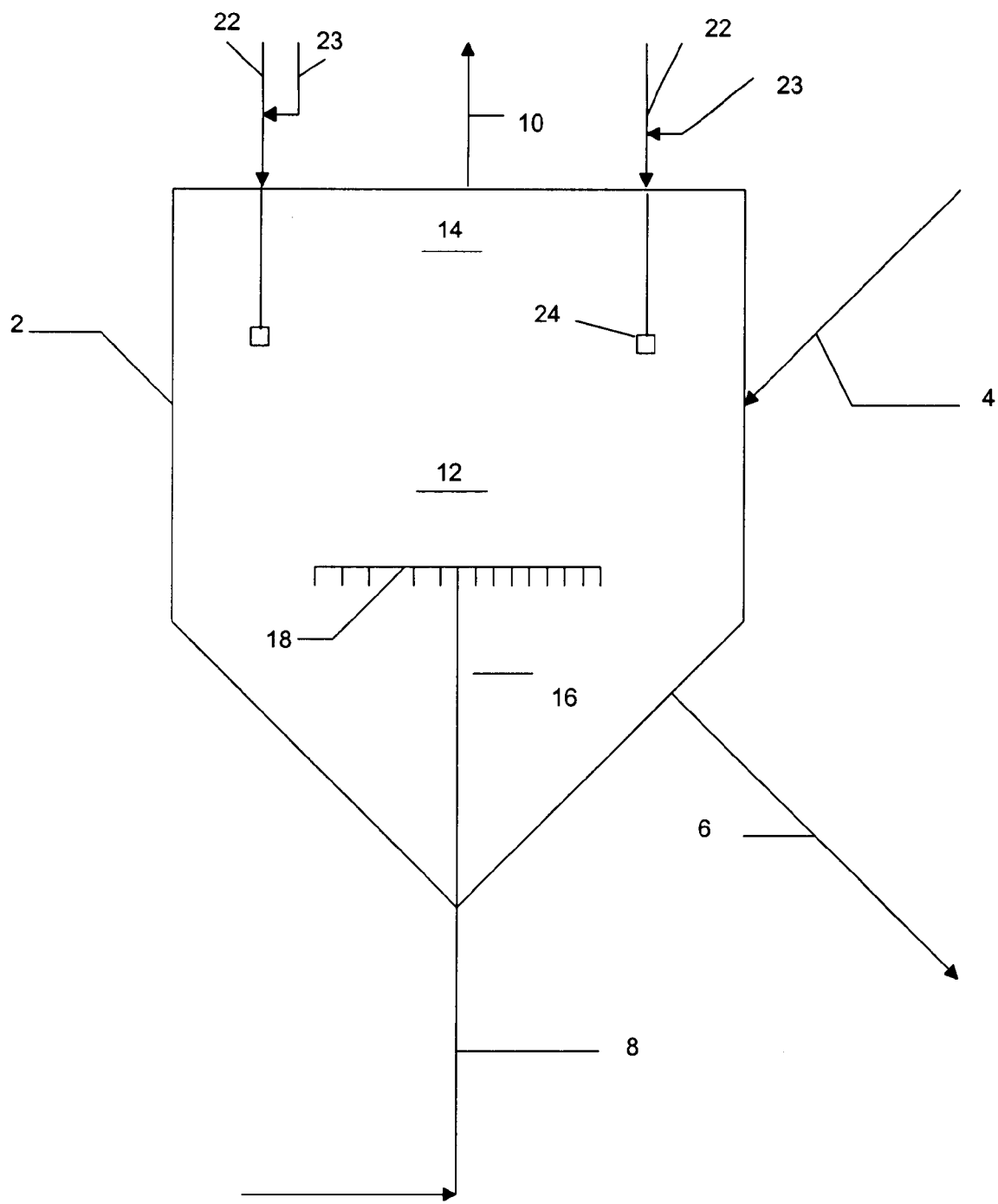
FIG. 1 is a cross sectional view of a regeneration vessel illustrating one embodiment of the present invention.

Referring to FIG. 1, in one embodiment of the present invention, spent catalyst is introduced into regeneration vessel 2 via spent catalyst transport line 4. Regenerated catalyst is transported out through transport line 6 as noted also in FIG. 3 and FIG. 5. The spent catalyst swirls around the interior of regeneration vessel 2 and settles into dense phase 12. Dilute phase 14 forms in the upper region of regeneration vessel 2 and is substantially free of spent catalyst. A primary oxygen-containing gas 8 is introduced into regeneration vessel 2 via air grid feed line 16, which feeds air grid 18. Air grid 18 is located within dense phase 12. The spent catalyst contacts the primary oxygen-containing gas 8 in dense phase 12, thereby combusting the coke on the surface of the spent catalyst, and forming a combustion gas containing carbon monoxide, carbon dioxide, nitrogen oxides, water vapor, and/or sulfur oxides. As a result of the CO present in the dense phase forming a reducing atmosphere, the nitrogen oxides formed near the air grid, by reactions of nitrogen species present in the coke with oxygen, are reduced to elemental nitrogen.

The combustion gas rapidly rises in regeneration vessel 2 and enters dilute phase 14. As the combustion gas rises up through dilute phase 14, a secondary oxygen-containing gas 22 and, preferably, a shield gas 23 are introduce into dilute phase 14 via one or more nozzles 24. The CO in the combustion gas is oxidized by the secondary oxygen-containing gas to form $CO_2$. The resulting temperature increase in dilute phase 14 due to the exothermic reaction associated with the oxidation of the carbon monoxide can be controlled by the injection of shield gas 23 into dilute phase 14 via one or more nozzles 24, or by using some other heat removal device, such as a heat exchanger. The combustion gas containing carbon dioxide and elemental nitrogen is vented from dilute phase 14 of regeneration vessel 2 through exhaust flue 10. While a specific number of nozzles, and nozzle locations are shown in FIG. 1, it is to be understood that regeneration vessel 2 can be configured with any number of nozzles at any number of angles. Depending on the number of nozzles used and the angle of their placement, the regenerator controls can be adjusted to achieve the desired combustion and afterburn control.

Figure 2:
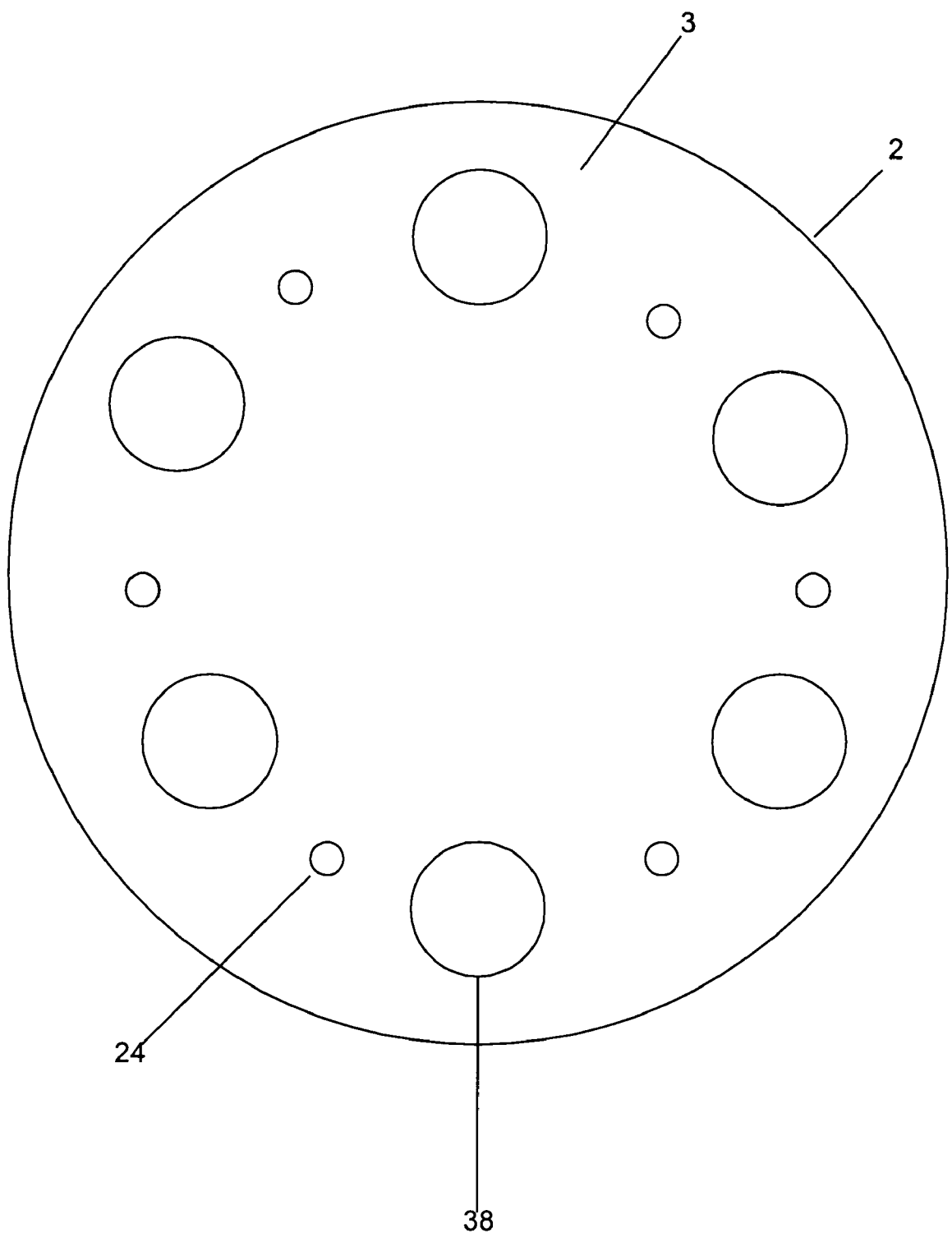
FIG. 2 is a top view of the regeneration vessel of FIG. 1.

By way of example, the above embodiment is further illustrated in FIG. 2, which is a top view of regeneration vessel 2 depicted in FIG. 1. One or more nozzles 24 for introducing the secondary oxygen-containing gas and shield gas may be positioned on top dome 3 of regeneration vessel 2 between one or more cyclones 38, also positioned on top dome 3 of regeneration vessel 2. The one or more nozzles 24 may be extended into the regeneration vessel 2 on a lance or angled such that the secondary oxygen-containing gas and the shield gas is injected deep into the dilute phase of regeneration vessel 2, achieving excellent mixing and optimum combustion conditions in the dilute phase. While a specific number of nozzles are shown in FIG. 2, it should be understood that regeneration vessel 2 can be configured with any number of nozzles at any number of angles. Depending on the number of nozzles used and the angle of their placement, the regenerator controls can be adjusted to achieve the desired combustion and afterburn control.

Figure 3:
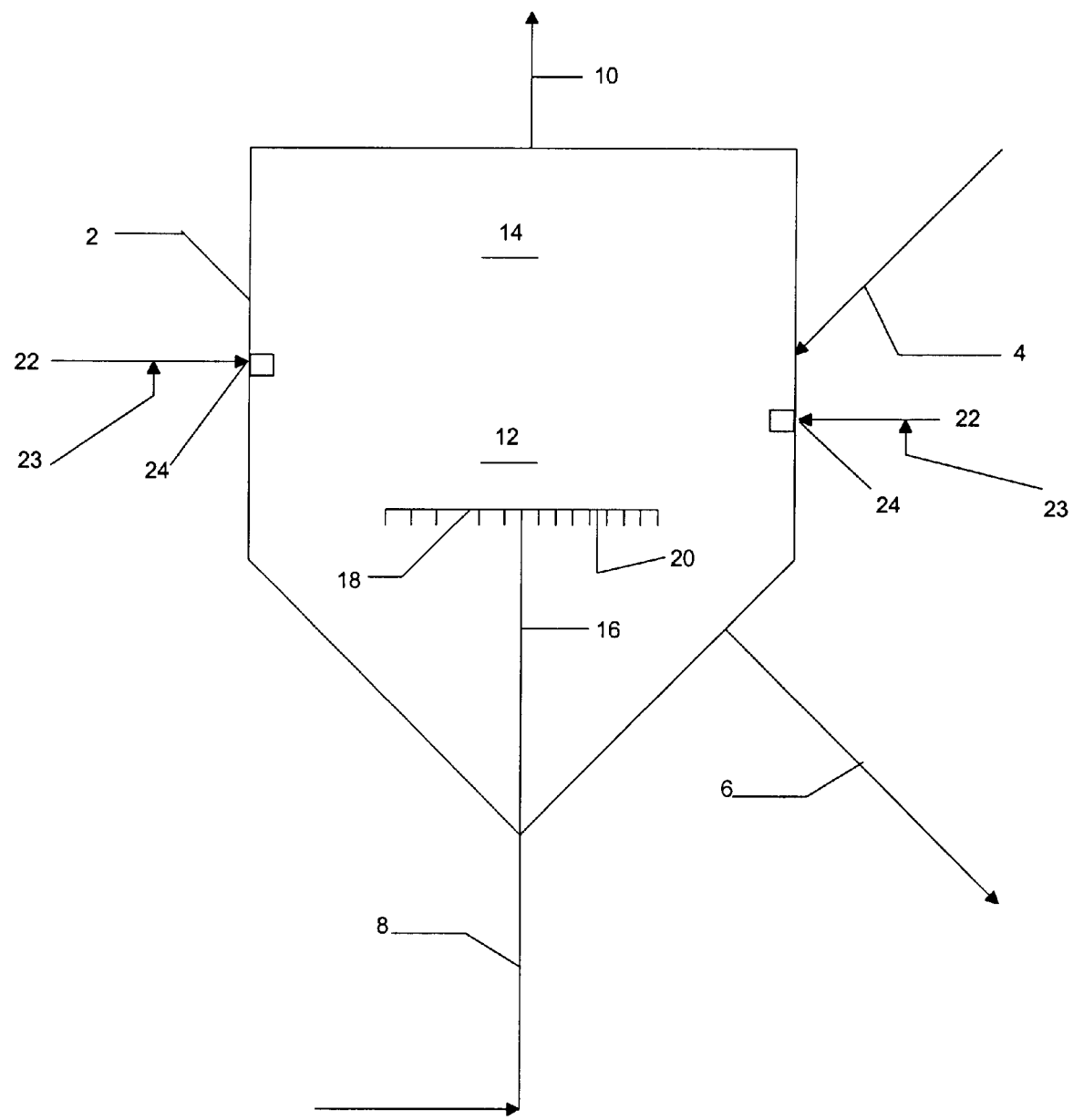
FIG. 3 is a cross sectional view of a regeneration vessel illustrating another embodiment of the present invention.
Figure 4:
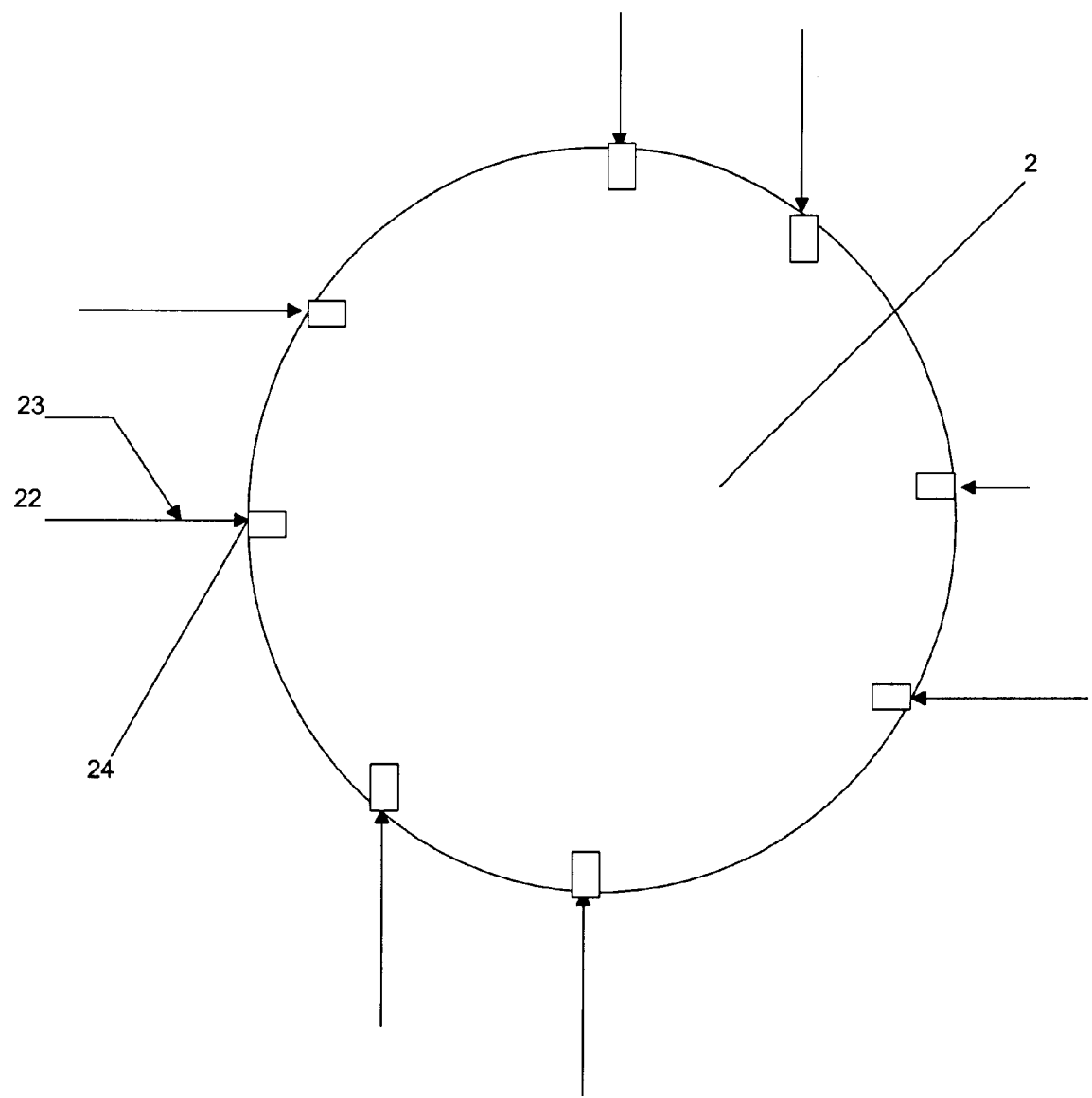
FIG. 4 is a top view of the regeneration vessel of FIG. 3.

Referring to FIGS. 3 and 4, another example of a regeneration vessel having one or more nozzles is depicted. The operation of this regeneration vessel is identical to that described above for the regeneration vessel depicted in FIG. 1. Regeneration vessel 2, depicted in FIG. 3, may be configured with one or more nozzles 24 located in the side wall of regeneration vessel 2. The nozzles may be placed at different vertical heights in the vessel in order to stage the introduction of the oxygen-containing gas. In addition, the one or more nozzles 24 can be angled such that secondary oxygen-containing gas 22 and, preferably, shield gas 23 are injected into dilute phase 14 such that the desired combustion and afterburn control is achieved. FIG. 4 shows the top view of regeneration vessel 2 of FIG. 3. One or more nozzles 24 can be located around the circumference of the vessel walls, at the desired heights and angles. While a specific number of nozzles are shown in FIG. 4, it should be understood that regeneration vessel 2 can be configured with any number of nozzles at any number of angles and heights. Depending on the number of nozzles used and the angle and height of their placement, the regenerator controls can be adjusted to achieve the desired combustion and afterburn control.

Figure 5:
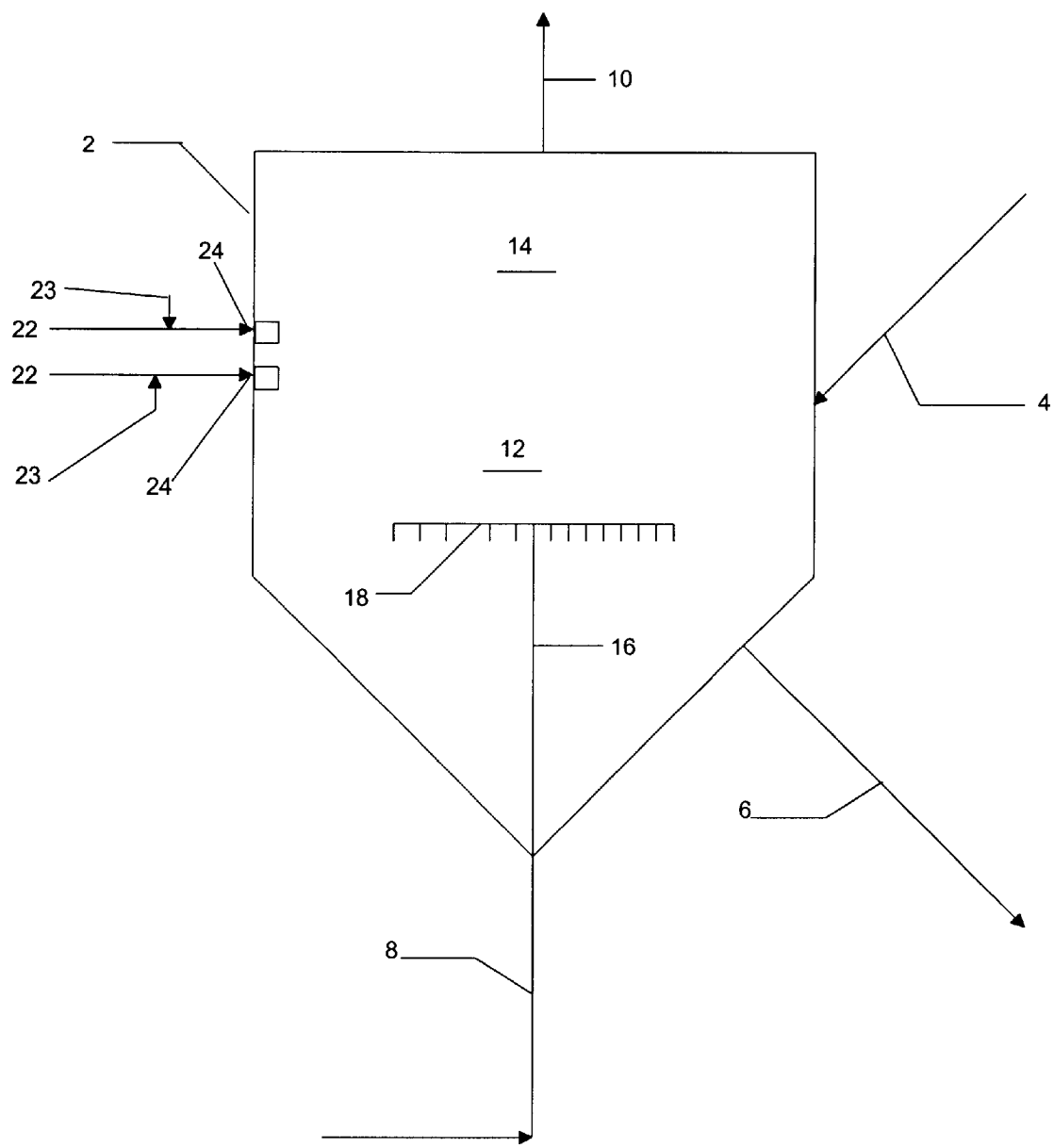
FIG. 5 is a cross sectional view of a regeneration vessel illustrating still another embodiment of the present invention.

Another embodiment of the present invention is depicted in FIG. 5. In this embodiment, prior to introducing the secondary oxygen-containing gas, as described in FIGS. 1 through 4 above, one or more nozzles 24 are used to stage the introduction of the secondary oxygen-containing gas to dilute phase 14 of vessel 2, at or just above the interface between dense phase 12 and dilute phase 14. This interface is the point where the combustion gas enters dilute phase 14 from dense phase 12. The $NH_3$ and HCN in the combustion gas are oxidized by the secondary oxygen-containing gas 22, which is introduced near the interface, resulting in the formation of nitrogen oxides. Little of the CO is oxidized by the secondary oxygen-containing gas 22 at this point. The majority of the CO present in dilute phase 14 is oxidized by the secondary oxygen-containing gas 22 that is introduced at a higher location in dilute phase 14 in the manner described in FIGS. 1 through 4 above. The resulting temperature increase in dilute phase 14 due to the exothermic reaction associated with the oxidation of the carbon monoxide is controlled by the injection of shield gas 23 into dilute phase 14 via one or more nozzles 24, or by some other heat removal device, such as a heat exchanger. Additionally, shield gas 23 comprising nitrogen or carbon dioxide or recirculated flue gases, introduced near the interface, assists in the even distribution of oxygen across the vessel and prevents the deactivation of catalyst in dense phase 12 in the case where shield gas 23, introduced at a higher location, is steam or water particles. While a specific number of nozzles are shown in FIG. 5, it should be understood that regeneration vessel 2 can be configured with any number of nozzles at any number of angles and heights. Depending on the number of nozzles used and the angle and height of their placement, the regenerator controls can be adjusted to achieve the desired combustion and afterburn control.

In another embodiment of the present invention (not shown), the secondary oxygen-containing gas is staged such that it is introduced to the exhaust flue of the vessel to prevent CO leakage. This additional secondary oxygen-containing gas oxidizes the small amount of residual CO that may be in the exhaust gas leaving the vessel to form $CO_2$. The secondary oxygen-containing gas may be introduced to the exhaust flue by one or more nozzles. Additionally, a shield gas may also be introduced to the exhaust flue to assist in the even distribution of oxygen across the exhaust flue and control temperature rise due to afterburn resulting from the exothermic oxidation of the CO. Depending on the number and the configuration of nozzles used, the regeneration vessel controls can be adjusted to achieve the desired combustion and afterburn control.

While any suitable nozzle may be used to inject the oxygen-containing gas and the shield gas into the regeneration vessel or exhaust flue, it is preferred that a co-centric nozzle be used. By using a co-centric nozzle, the oxygen-containing gas and the shield gas can be simultaneously injected. As a result, the desired combustion can be achieved while concurrently controlling the resulting temperature rise due to afterburn with the shield gas. The co-centric nozzles are configured to allow penetration of the gases deep into the regenerator vessel dilute phase to effect good mixing and the desired reactions. Preferably, the nozzles are located externally through the walls of the regenerator and/or through the top dome of the regenerator.

Figure 6:
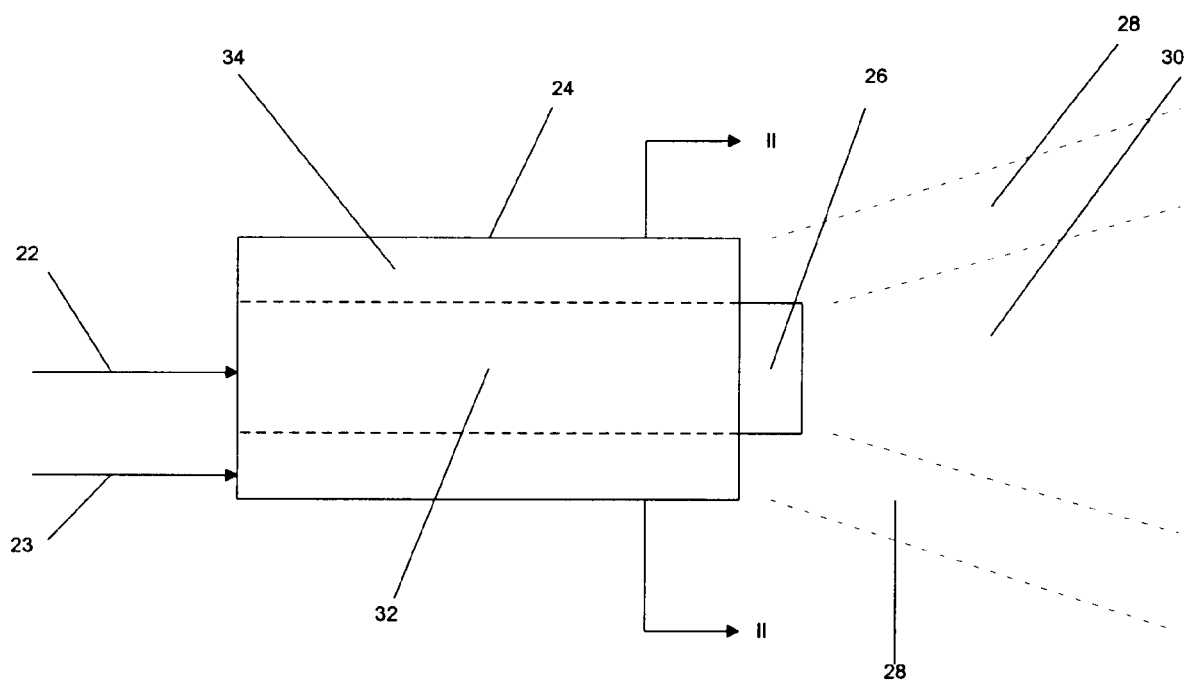
FIG. 6 is a side view of a co-centric nozzle according to the present invention.
Figure 7:
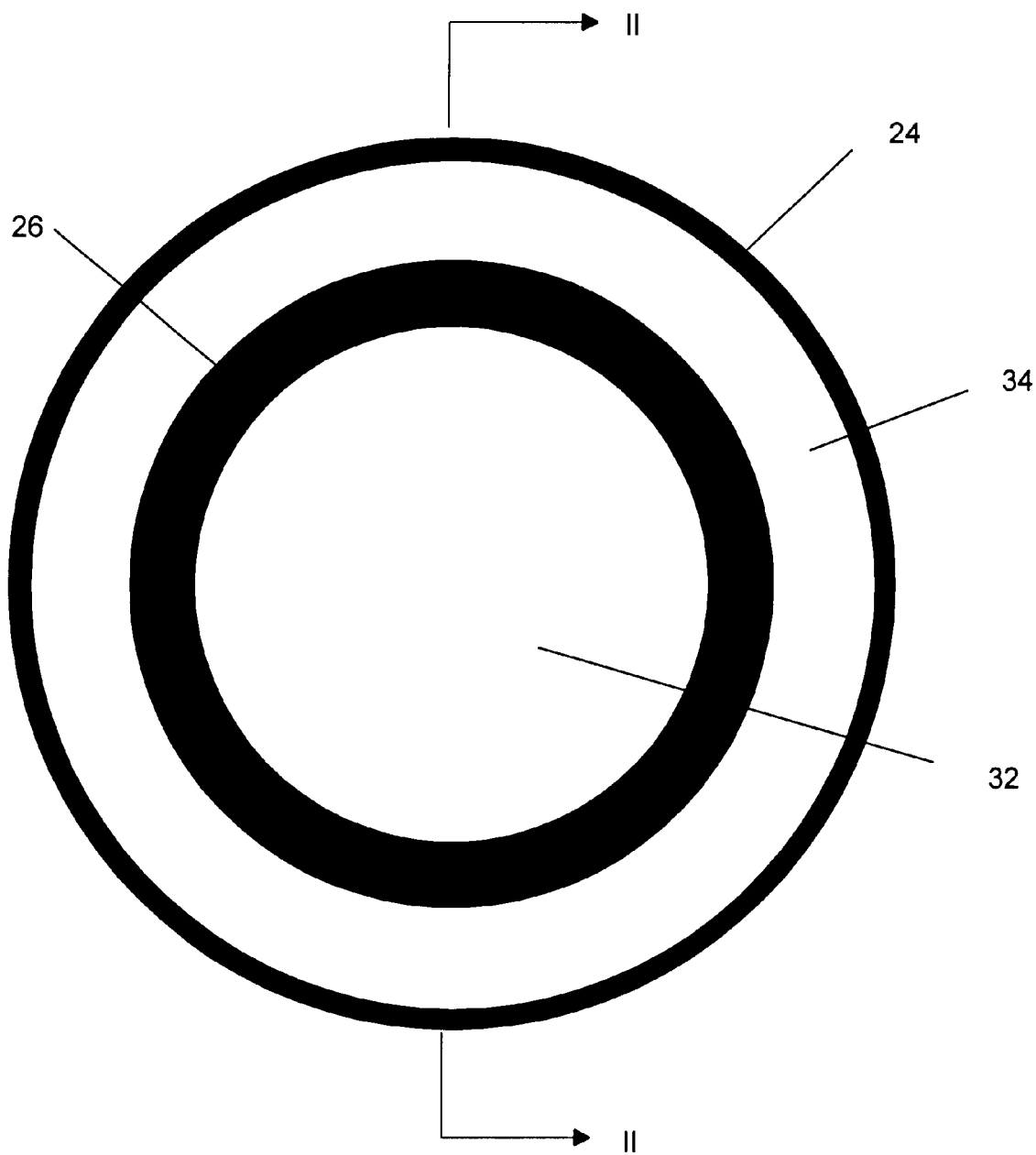
FIG. 7 is a front view of the co-centric nozzle taken along lines II—II of FIG. 6.

Referring to FIGS. 6 and 7, an example of a co-centric nozzle is provided. Co-centric nozzle 24 has nozzle head 26, inner delivery channel 32, and outer delivery channel 34. Oxygen-containing gas 22 is fed to inner delivery channel 32 and is injected into the regeneration vessel through nozzle head 26 as oxygen-containing gas stream 30. Shield gas 23 is fed to outer delivery channel 34 and is injected into the regeneration vessel as shield gas stream 28, which surrounds the entire circumference of oxygen-containing gas stream 30 upon discharge from nozzle 24. By introducing the oxygen-containing gas and the shield gas into the regeneration vessel via one or more co-centric nozzles, deeper penetration and a more uniform dispersion of the gases throughout the vessel is achieved.

The primary oxygen-containing gas injected into the air grid in the dense phase of the regeneration vessel may be any typical feed gas mixture, for example, air, oxygen-enriched air, oxygen-carbon dioxide, oxygen-argon, and mixture thereof. preferred gas mixtures include air and oxygen-enriched air. It is preferred that the gas mixture has an oxygen content that is at least 20% by volume and more preferably greater than 24% by volume. The primary oxygen-containing gas is fed to the air grid in the dense phase at a superficial vessel velocity from about 0.5 to about 10.0 fl/sec. This allows for the conversion of most of the coke nitrogen species to elemental nitrogen, NO, and $NO_2$ in the dense catalyst phase. Small amounts of reduced nitrogen species, such as $NH_3$ and HCN may also be present in the combustion gas exiting the dense catalyst phase.

The regeneration vessel conditions (i.e., regeneration gas flow, catalyst circulation rate, etc.) are adjusted such that throughout the dense phase, excluding the combustion zone in the immediate vicinity of the air grid, reducing conditions are maintained so as to allow sufficient residence time for the $CO/NO_x$ reactions resulting in the formation of elemental nitrogen. To assure these conditions exist, up to about 1% CO is present in the combustion gas exiting the dense phase and rising into the dilute phase of the regeneration vessel.

The maximum oxygen throughput in the dense phase of the regeneration vessel relative to the amount of coke to be burned is controlled such that the average temperature in the dense phase is in the range from about 650° C. to 815° C. Preferably, the average temperature in the dense phase of the regeneration vessel is from about 670° C. to 790° C.

The secondary oxygen-containing gas introduced into the dilute phase or the exhaust flue of the regeneration vessel may be any typical feed gas mixture, for example, air, oxygen-enriched air, oxygen-carbon dioxide, oxygen-argon, and mixtures thereof. Preferred gas mixtures include air and oxygen-enriched air. It is preferred that the gas mixture has an oxygen content that is at least 20% by volume, and more preferably at least 24% by volume, and is fed to the dilute phase at a velocity from about 50 ft/sec to 400 ft/sec through nozzles to allow for an even distribution of oxygen in the dilute phase.

The amount of oxygen introduced in the secondary oxygen-containing gas stream is 3 to 50 times smaller than that entering the primary oxygen-containing gas stream introduced through the air grid. The amount of oxygen is selected so as to be sufficient for residual CO combustion. A majority of the coke combustion still occurs within the dense phase of the regenerator.

In concert with the use of a shield gas or a mechanical device to cool the dilute catalyst phase, the maximum concentration of oxygen entering the dilute phase of the regeneration vessel is controlled such that the average temperature increase in the dilute phase due to the combustion is from about 10° C. to 50° C. Preferably, the average temperature increase in the dilute phase of the regeneration vessel is less than 30° C. Various means of cooling the dilute phase can be used, such as, for example, a heat exchanger, atomized water, steam, and combinations thereof. When atomized water is used, the cooling is effected by the phase change and sensible heat required to equalize the temperature of the water and combustion gases. When steam is used, the cooler temperature of the steam being introduced lowers the temperature of the combustion gases through direct heat exchange.

Suitable shield gas that is injected into the dilute phase may include, for example, gas selected from the group consisting of: steam, nitrogen, recirculated flue gases, carbon dioxide, and mixtures thereof. Preferably, the shield gas introduced with the secondary gas stream is steam or water mist and is introduced into the dilute phase at a velocity from about 50 ft/sec to 400 ft/sec. Steam or water allows for some cooling of the dilute phase and enhances the conversion of CO to $CO_2$. In the case where the secondary oxygen-containing gas is staged such that it is introduced at the interface between the dense and dilute phases of the vessel, the shield gas introduced is preferably nitrogen or recirculated flue gas and is introduced at a velocity from about 50 ft/sec to 400 ft/sec.

The present invention is further illustrated, but not limited, by the examples below.

EXAMPLE 1

For a 40 TBD FCC unit, about 4 MMSCFH air would be used as the feed gas. If one used a 90/10 split of air with 90% being fed to the dense phase of the regeneration vessel and 10% being fed to the dilute phase of the regeneration vessel, about 400,000 SCFH air would be fed through the one or more nozzles. Assuming, for example, that 20 nozzles are used, velocities of over 200 ft/sec can be achieved with 2" diameter nozzles. This is sufficient to move the air about 15 ft into the regeneration vessel. If a shield gas, such as steam or recirculated flue gas is used in a co-centric nozzle design, the air or enriched air can be propelled even further, and with a more uniform dispersion of $O_2$ throughout the regeneration vessel cross-section. Nozzles would be angled to achieve the desired flow pattern and two or more levels of oxygen introduction may be used. The temperature rise due to afterburn, in this case, is expected to be in the range 20 to 100° C., which can be mitigated with the injected steam or other quenching gases, which comprise the shield gas, or by mechanical means.

Experiments conducted in a 3" fluidized bed reactor revealed that with a residence time of 28 sec, 1% CO entering the dilute phase was completely removed to undetectable levels by introducing only 1% $O_2$ at 700° C. in the absence of any catalyst. Although the residence time is somewhat longer than typically expected, substantial reduction of CO is expected by adjusting the $O_2$ injection level.

EXAMPLE 2

A 1" ID reactor system was used to perform CO kinetic experiments. A T-mixing station was placed at the entrance to the reactor with preheating of the feeds so that hot feeds could be mixed in a rigorous fashion just prior to entering the reactor. A cooling coil exchanger was placed at the reactor outlet to cool exit gases quickly.

Results, presented in Table 1 below, indicate that CO combustion could be achieved by 1% to 2% $O_2$ in the dilute phase of a FCC regeneration vessel operating at typical temperatures in the range of 700° C. or higher in the case where a CO boiler is not available and carbon monoxide exiting the dense catalyst bed has a concentration of up to 1%. About 10 seconds of gas residence time appears to reduce CO from approximately 1% to the 200 ppm range, and a typical FCC regeneration vessel would have over 10 seconds of gas residence time available for this purpose.

TABLE 1

CO Combustion Results

| Temperature (° C.) | Residence Time (sec) | $O_2$ in (%) | CO in (%) | CO out (ppm) |
|---|---|---|---|---|
| 700 | 10 | 1.8 | 1 | 200 |
| 700 | 10 | 0.9 | 1 | 250 |

EXAMPLE 3

For nitrogen oxide (NO) experimentation, a 1" ID reactor was used with an expanded head region for catalyst disengagement. A high matrix equilibrium FCC catalyst was used, and gas residence time in the catalyst bed was calculated to be 2 seconds. Typical gas residence time in a FCC dense phase catalyst bed is over 3 seconds. The reactor was maintained at roughly 730° C. throughout the experiments.

First, the catalyst was exposed to 21% $O_2$ in $N_2$ for 5 minutes. The catalyst was then exposed to 1.5% $H_2$ in $N_2$ for 2 minutes. This procedure is meant to simulate the time the catalyst is in the regeneration vessel in an oxidizing atmosphere and then in the riser/stripper in a reducing atmosphere. $N_2$ was used to briefly purge the catalyst after each step. A stream containing 0.5% CO and 500 ppm NO in $N_2$ was passed over the catalyst with a 2 second residence time in the catalyst bed. The concentration of NO exiting the reactor was too small to measure. The experiment was repeated with 1% CO, 0.5% $O_2$ and 500 ppm NO entering the reactor. Again, the concentration of NO exiting the reactor was too small to measure. These results indicate that under conditions similar to those in a FCC regeneration vessel, NO would be destroyed by CO.

Experiments were also conducted in a steady state mode as described in Table 2 below with complete elimination of NO in the reactor. In these experiments, 500 ppm NO entered the reactor along with the compositions described in Table 2, and $N_2$.

TABLE 2

NO Reaction with CO Results

| Temperature (° C.) | Residence Time (sec) | $O_2$ in (%) | CO in (%) | NO out (ppm) |
|---|---|---|---|---|
| 730 | 2 | 0 | 0.5 | 0 |
| 730 | 2 | 0.5 | 1 | 0 |

EXAMPLE 4

For $NH_3$ and HCN kinetic experimentation, a 1" ID reactor was used without catalyst present in order to simulate the dilute catalyst phase. The data in Table 3 indicates that in a 4 second residence time, oxygen could be introduced to a stream with as high as 2% CO and still obtain preferential oxidation of $NH_3$ and HCN. When the concentration of $O_2$ exiting the reaction zone is in the range of 100 to 200 ppm, a significant portion of the resulting NO is destroyed, even in that relatively short residence time.

TABLE 3

FCC Regenerator chemistry (700° C., 4 sec residence time, quartz reactor, non-catalytic)

| IN | | | | | OUT | | | | | |
|---|---|---|---|---|---|---|---|---|---|---|
| $O_2$ Ppm | CO % | $NH_3$ ppm | HCN ppm | NO Ppm | $O_2$ ppm | CO % | $CO_2$ % | $NH_3$ ppm | HCN ppm | NO ppm |
| 2200 | 2 | 300 | 0 | 0 | 200 | 1.6 | 0.4 | 0 | 0 | 75 |
| 6600 | 2 | 300 | 0 | 0 | 700 | 0.8 | 1.2 | 0 | 0 | 260 |
| 11000 | 2 | 300 | 0 | 0 | 1900 | 0.16 | 1.7 | 0 | 0 | 275 |
| 2200 | 2 | 0 | 300 | 0 | 100 | 1.6 | 0.4 | 10 | 0 | 100 |
| 6600 | 2 | 0 | 300 | 0 | 2500 | 0.8 | 1.2 | 0 | 0 | 240 |
| 11000 | 2 | 0 | 300 | 0 | 4300 | 0.7 | 1.2 | 0 | 0 | 250 |
| 2200 | 2 | 0 | 0 | 300 | 100 | 1.7 | 0.3 | 0 | 0 | 10 |
| 11000 | 2 | 0 | 0 | 300 | 1800 | 0.18 | 1.7 | 0 | 0 | 290 |
| 0 | 1.1 | 0 | 0 | 500 | 0 | 1 | 0.04 | 0 | 0 | 0 |

EXAMPLE 5

When the concentration of water vapor was increased from about 0% to 8%, the conversion of CO to $CO_2$ was enhanced with near complete conversion in a 1 second residence time, non-catalytic reaction. This short residence time requirement adds additional flexibility for multistage configurations.

TABLE 4

Effect of water on CO and nitrogen compound reactions (700° C. and 1 sec residence time, quartz reactor, no catalyst)

| IN | | | OUT | | |
|---|---|---|---|---|---|
| $O_2$ Ppm | CO % | $H_2O$ % | $O_2$ ppm | CO % | $CO_2$ % |
| 3000 | 1 | 0 | 2000 | 0.8 | 0.15 |
| 3000 | 1 | 8 | 100 | 0.4 | 0.55 |
| 4000 | 1 | 8 | 400 | 0.07 | 0.84 |
| 3000 | 1 | 0 | 2200 | 0.8 | 0.14 |
| 3000 | 1 | 8 | 0 | 0.26 | 0.67 |
| 4000 | 1 | 8 | 200 | 0.03 | 0.87 |

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for substantially reducing the emission of nitrogen oxides from a regeneration reactor during the regeneration of spent catalyst having coke deposits thereon, which comprises the steps of:
   (a) contacting said spent catalyst with a primary oxygen-containing gas in a dense phase of said reactor, thereby combusting said coke and forming a combustion gas comprising nitrogen oxide and carbon monoxide which further react in said dense phase, thus reducing a majority of the nitrogen oxides to form elemental nitrogen, thereby forming a nitrogen-enriched combustion gas; and
   (b) passing said nitrogen-enriched combustion gas through the interface between said dense phase and a dilute phase; contacting said nitrogen-enriched combustion gas with secondary oxygen-containing gas at a location just above said interface, and contacting said nitrogen-enriched combustion gas with secondary oxygen-containing gas in said dilute phase, wherein said carbon monoxide is oxidized into carbon dioxide; wherein the amount of said primary oxygen-containing gas in step (a) is adjusted so that said nitrogen-enriched combustion gas prior to step (b) comprises up to 1% carbon monoxide.

2. The process of claim 1, wherein said catalyst is a hydrocarbon cracking catalyst.

3. The process of claim 1, further comprising, after step (b), a step of contacting said combustion gas in a reactor exhaust flue with an oxygen-containing gas, thereby oxidizing residual CO to form $CO_2$ and eliminating or reducing CO leakage from said reactor.

4. The process of claim 3, wherein said oxygen-containing gas is said secondary oxygen-containing gas.

5. The process of claim 3, wherein said reactor exhaust flue further comprises one or more nozzles for introducing said oxygen-containing gas into said reactor exhaust flue.

6. The process of claim 1, wherein said reactor further comprises a plurality of nozzles for introducing said secondary oxygen-containing gas into said reactor.

7. The process of claim 6, wherein said a plurality of nozzles is a co-centric nozzle such that a shield gas is disposed about said secondary oxygen-containing gas.

8. The process of claim 1, wherein said reactor further comprises one or more nozzles for introducing said secondary oxygen-containing gas into said dilute phase.

9. The process of claim 8, wherein said one or more nozzles is a co-centric nozzle such that a shield gas is disposed about said secondary oxygen-containing gas.

10. The process of claim 1, further comprising introducing a shield gas to said dilute phase during step (b).

11. The process of claim 10, wherein said shield gas controls temperature rise in said dilute phase due to afterburn.

12. The process of claim 11, wherein said temperature rise is between about 10 to 50° C.

13. The process of claim 10, wherein said shield gas is selected from the group consisting of: steam, water mist, nitrogen, recirculated flue gases, carbon dioxide, and mixtures thereof.

14. The process of claim 1, further comprising introducing a shield gas to said interface of said reactor.

15. The process of claim 14, wherein a portion of said shield gas prevents the deactivation of said catalyst in said dense phase.

16. The process of claim 14, wherein said shield gas is selected from the group consisting of: nitrogen, recirculated flue gases, carbon dioxide, and mixtures thereof.

17. The process of claim 1, wherein said reactor is operated at a temperature in the range between about 650° C. to 835° C.

18. The process of claim 17, wherein said temperature is in the range between about 670° C. to 790° C.

19. The process of claim 1, wherein said primary oxygen-containing gas is selected from the group consisting of: air, oxygen-enriched air, oxygen-carbon dioxide, oxygen-argon, oxygen-enriched air-carbon dioxide, and mixtures thereof.

20. The process of claim 1, wherein said primary oxygen-containing gas has an oxygen concentration of at least about 20%, by volume.

21. The process of claim 1, wherein said secondary oxygen-containing gas is selected from the group consisting of: air, oxygen-enriched air, oxygen-carbon dioxide, oxygen-argon, and mixtures thereof.

22. The process of claim 1, wherein said secondary oxygen-containing gas in step (b) is fed to said dilute phase at a velocity in the range between about 50 ft/sec and 400 ft/sec.

23. The process of claim 1, wherein said secondary oxygen-containing gas has an oxygen concentration of at least about 20% by volume.

* * * * *